(12) United States Patent
Le

(10) Patent No.: US 12,332,698 B2
(45) Date of Patent: Jun. 17, 2025

(54) ELECTRONIC DEVICE

(71) Applicant: VIVO MOBILE COMMUNICATION CO., LTD., Guangdong (CN)

(72) Inventor: Lidong Le, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 252 days.

(21) Appl. No.: 18/335,904

(22) Filed: Jun. 15, 2023

(65) Prior Publication Data

US 2023/0324961 A1    Oct. 12, 2023

Related U.S. Application Data

(63) Continuation of application No. PCT/CN2021/138169, filed on Dec. 15, 2021.

(30) Foreign Application Priority Data

Dec. 18, 2020    (CN) .......................... 202011510931.8

(51) Int. Cl.
    *G06F 1/16*    (2006.01)
    *G10K 11/22*   (2006.01)
    (Continued)

(52) U.S. Cl.
    CPC ............ *G06F 1/1656* (2013.01); *G10K 11/22* (2013.01); *H04R 1/023* (2013.01); *H04R 1/2857* (2013.01); *H04R 2499/11* (2013.01)

(58) Field of Classification Search
    CPC ....... G06F 1/1656; G10K 11/22; H04R 1/023; H04R 1/2857
    See application file for complete search history.

(56) References Cited

U.S. PATENT DOCUMENTS

| 11,032,509 B2* | 6/2021 | Lee .................... H04N 5/642 |
| 11,765,259 B2* | 9/2023 | Lee .................... H05K 5/00 |
| | | 381/334 |

(Continued)

FOREIGN PATENT DOCUMENTS

| CN | 104470281 A | 3/2015 |
| CN | 204948146 U | 1/2016 |

(Continued)

OTHER PUBLICATIONS

Extended European Search Report for Application No. 21905725.4, dated May 3, 2024, 9 Pages.

(Continued)

*Primary Examiner* — Anthony M Haughton
(74) *Attorney, Agent, or Firm* — BROOKS KUSHMAN P.C.

(57) ABSTRACT

An electronic device is provided, and includes a housing, an acoustical component, and a communication support. The housing has an inner cavity, and the acoustical component is disposed in the inner cavity. The housing is provided with a first sound guide channel. The acoustical component is provided with a first installation groove. A bottom wall of the first installation groove is provided with a sound guide opening. The communication support is provided with a second sound guide channel. A first end of the communication support is disposed in the first installation groove. The sound guide opening is in communication with the first sound guide channel through the second sound guide channel. A part, between the housing and the acoustical component, of the communication support, is a flexible connection section.

10 Claims, 3 Drawing Sheets

(51) Int. Cl.
*H04R 1/02* (2006.01)
*H04R 1/28* (2006.01)
*H05K 5/00* (2025.01)
*H05K 7/00* (2006.01)

(56) References Cited

U.S. PATENT DOCUMENTS

| | | | |
|---|---|---|---|
| 11,871,178 B2* | 1/2024 | Park | G04G 17/02 |
| 12,069,355 B2* | 8/2024 | Kim | G06F 1/1626 |
| 12,200,153 B2* | 1/2025 | Yun | H04R 1/083 |
| 12,256,190 B2* | 3/2025 | Yang | H04R 1/2811 |
| 2006/0051075 A1 | 3/2006 | Wada | |
| 2016/0219360 A1* | 7/2016 | Zhao | H04R 1/2823 |
| 2018/0077273 A1 | 3/2018 | Huh et al. | |
| 2018/0132020 A1* | 5/2018 | Seo | H04M 1/03 |
| 2018/0227668 A1 | 8/2018 | Park et al. | |
| 2019/0082083 A1 | 3/2019 | Jarvis et al. | |
| 2020/0059579 A1 | 2/2020 | Jarvis et al. | |
| 2021/0144458 A1* | 5/2021 | Zhang | H04R 1/02 |
| 2022/0132232 A1* | 4/2022 | Jiang | H04R 1/083 |
| 2023/0007109 A1* | 1/2023 | Liang | H04M 1/0264 |
| 2024/0244129 A1* | 7/2024 | Jiang | H04R 1/086 |

FOREIGN PATENT DOCUMENTS

| | | |
|---|---|---|
| CN | 208572417 U | 3/2019 |
| CN | 209594090 U | 11/2019 |
| CN | 210016491 U | 2/2020 |
| CN | 111108756 A | 5/2020 |
| CN | 210579183 U | 5/2020 |
| CN | 210670477 U | 6/2020 |
| CN | 111405400 A | 7/2020 |
| CN | 210949982 U | 7/2020 |
| CN | 112040042 A | 12/2020 |
| CN | 112616099 A | 4/2021 |
| KR | 20180092219 A | 8/2018 |

OTHER PUBLICATIONS

First Office Action for Korean Application No. 10-2023-7024088, dated Jun. 21, 2024, 6 Pages.
First Office Action for Chinese Application No. 202011510931.8, dated Oct. 14, 2022, 7 Pages.
National Laboratory of Solid State Microstructures and Department of Physics "Research on the design and diaphragm of Electrostatic loudspeaker" Xin Zhang, May 2016, 91 Pages.
International Search Report and Written Opinion for Application No. PCT /CN2021/138169, dated Mar. 10, 2022, 8 Pages.

* cited by examiner

ELECTRONIC DEVICE

CROSS-REFERENCE TO RELATED APPLICATIONS

This application is a continuation of PCT International Application No. PCT/CN2021/138169 filed on Dec. 15, 2021, which claims priority to Chinese Patent Application No. 202011510931.8, filed on Dec. 18, 2020, which are incorporated herein by reference in their entireties.

TECHNICAL FIELD

This application relates to the technical field of communication devices, and in particular to an electronic device.

BACKGROUND

With the continuous development of electronic devices, the electronic devices are used in various scenarios. Requirements for a waterproof grade and a dustproof grade of an electronic device are different in different usage scenarios. Therefore, how to effectively increase the waterproof grade and dustproof grade of the electronic device has become an issue that people concern increasingly.

At present, an acoustical component is disposed in the electronic device. The acoustical component is connected to a sound guide channel on a housing in a sealing manner. A dustproof net and a sealing component are disposed between the acoustical component and the housing. The sealing component is sandwiched between the acoustical component and the housing, thereby implementing sealing between the acoustical component and the housing. However, in actual assembly, an assembly error exists in the acoustical component. Therefore, the acoustical component is dislocated easily. Accordingly, a compression area of the sealing component and sealing performance of the sealing component cannot be ensured easily. It can be seen that a problem of a poor sealing effect exists in a current electronic device.

SUMMARY

This application discloses an electronic device, the following technical solutions are used in this application.

An electronic device is provided, including a housing, an acoustical component, and a communication support.

The housing has an inner cavity, and the acoustical component is disposed in the inner cavity. The housing is provided with a first sound guide channel.

The acoustical component is provided with a first installation groove. A bottom wall of the first installation groove is provided with a sound guide opening.

The communication support is provided with a second sound guide channel. A first end of the communication support is disposed in the first installation groove. The sound guide opening is in communication with the first sound guide channel through the second sound guide channel.

A part, between the housing and the acoustical component, of the communication support, is a flexible connection section.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

Figure 1:
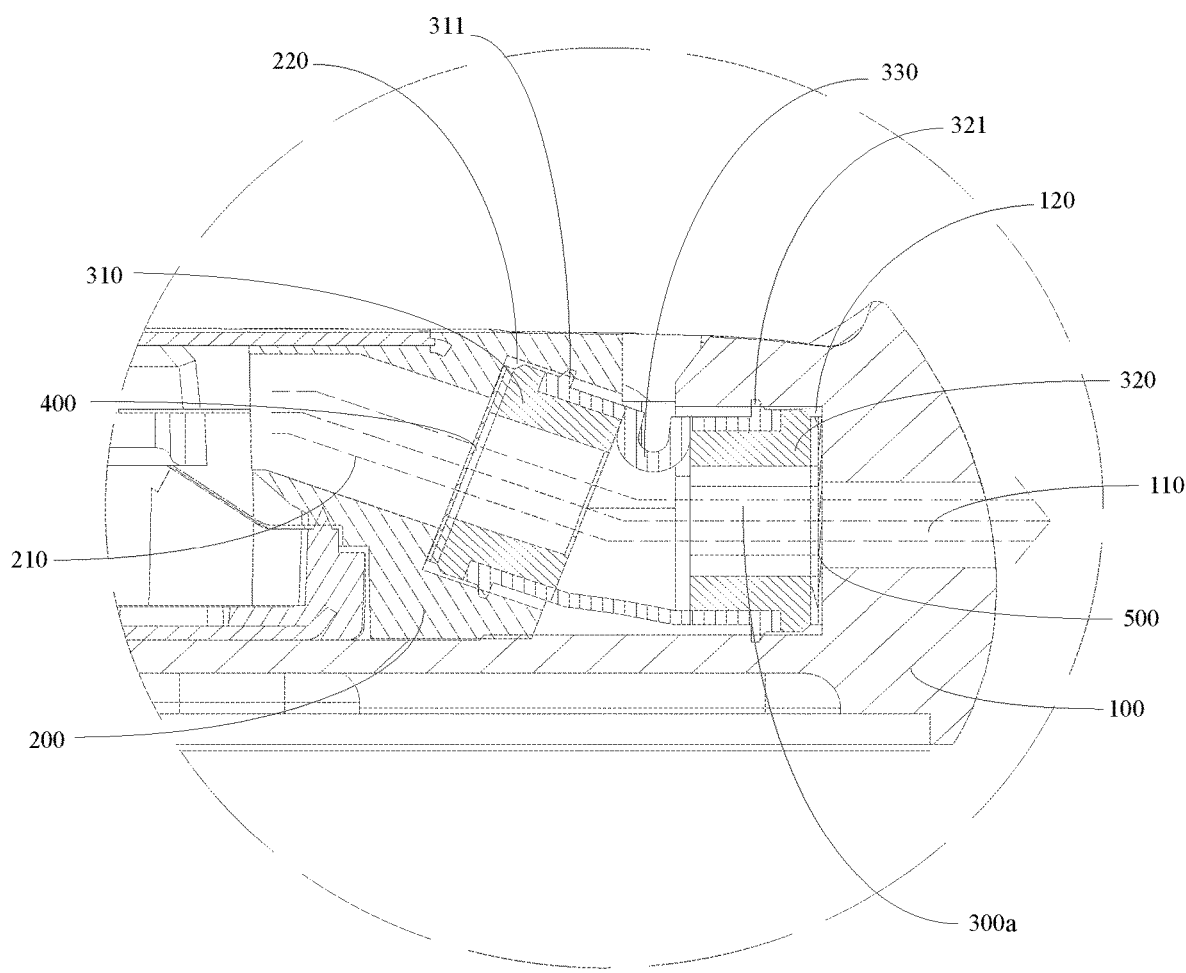
FIG. 1 is a sectional view of a partial structure of an electronic device disclosed in an embodiment of this application.

Reference numerals in the accompanying drawings are as follows:

100—Housing, 110—First sound guide channel, and 120—Second installation groove;

200—acoustical component, 210—Sound guide opening, and 220—First installation groove;

300—Communication support, 300a—Second sound guide channel, 310—First cylindrical sub-support, 320—Second cylindrical sub-support, 330—Flexible connecting cylindrical member, 311—First annular elastic sealing protrusion, 311a—First guide slope, 321—Second annular elastic sealing protrusion, 312a—Second guide slope, 312—First limiting protrusion, and 322—Second limiting protrusion;

400—First dustproof net; and

500—Second dustproof net.

DETAILED DESCRIPTION

To make the objectives, technical solutions, and advantages of this application clearer, the following clearly describes the technical solutions of this application with reference to the specific embodiments of this application and the corresponding accompanying drawings. Apparently, the described embodiments are merely some rather than all of the embodiments of this application. All other embodiments obtained by a person of ordinary skill in the art based on the embodiments of this application shall fall within the protection scope of this application.

The technical solutions disclosed in the embodiments of this application are described in detail below with reference to the accompanying drawings.

Figure 2:
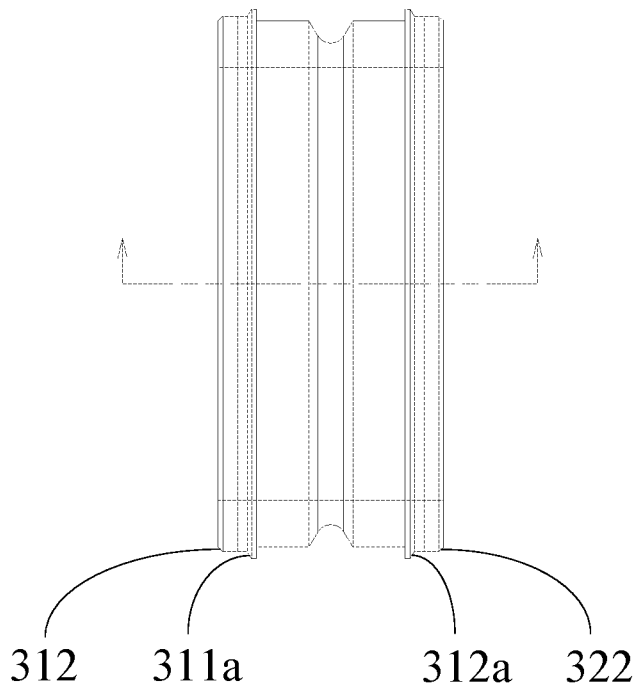
FIG. 2 is a top view of a communication support disclosed in an embodiment of this application.
Figure 3:
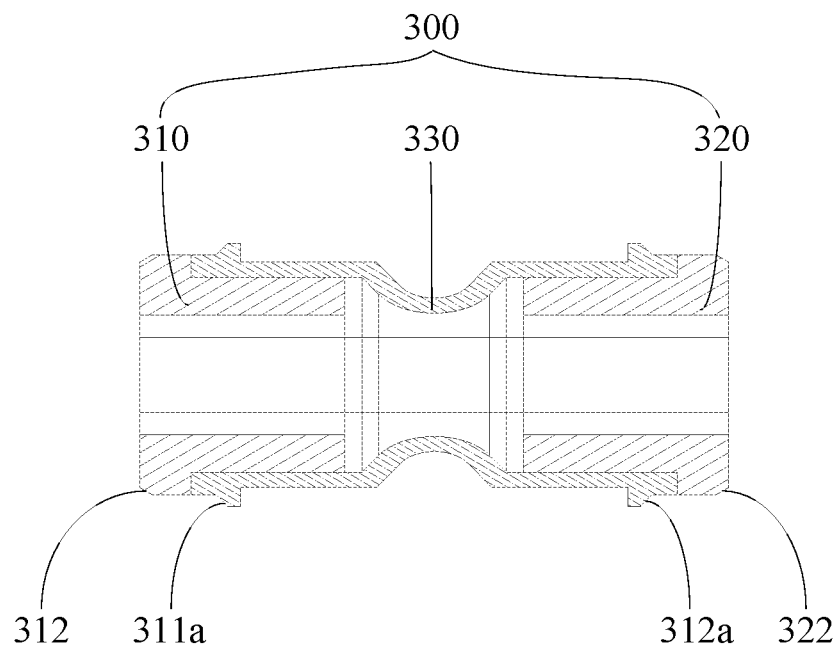
FIG. 3 is a sectional view of a communication support disclosed in an embodiment of this application.
Figure 4:
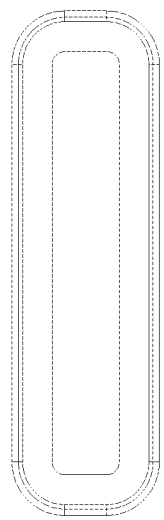
FIG. 4 is a side view of a communication support disclosed in an embodiment of this application.
Figure 5:
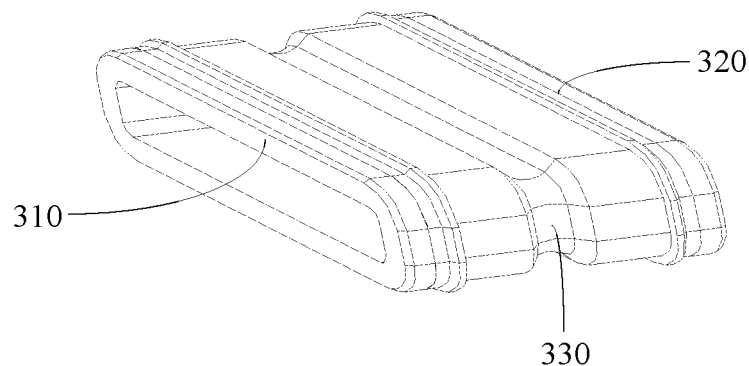
FIG. 5 is a schematic diagram of a communication support disclosed in an embodiment of this application.
Figure 6:
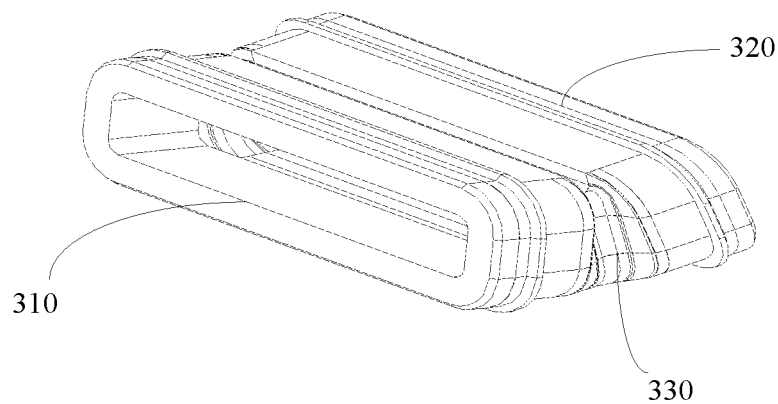
FIG. 6 is a schematic diagram of a communication support, after a flexible connecting cylindrical member is deformed, disclosed an embodiment of this application.

As shown in FIG. 1 to FIG. 6, embodiments of this application disclose an electronic device. The disclosed electronic device includes a housing 100, an acoustical component 200, and a communication support 300.

The housing 100 is a basic component of the electronic device. The housing 100 may provide an installation foundation for some other components in the electronic device. An inner cavity is disposed in the housing 100. The inner cavity is a piece of installation space, and may accommodate some other components of the electronic device. The acoustical component 200 is disposed in the inner cavity. In addition, the inner cavity may also provide protection for some other components (such as a motherboard and battery) of the electronic device.

The housing 100 is provided with a first sound guide channel 110. The first sound guide channel 110 penetrates from an inner wall of the housing 100 to an outer surface of the housing 100. A sound signal output by the acoustical component 200 can finally propagate to an external environment through the first sound guide channel 110. Alternatively, a sound signal in the external environment can be finally collected by the acoustical component 200 after penetrating the first sound guide channel 110.

The acoustical component 200 is provided with a first installation groove 220. The first installation groove 220 is configured to be matched with the communication support 300. A bottom wall of the first installation groove 220 is provided with a sound guide opening 210. That is, the sound guide opening 210 is in communication with space in the first installation groove 220. The sound guide opening 210 is an opening for propagating the sound signal. The sound signal output by the acoustical component 200 propagates to the first sound guide channel 110 through the sound guide opening 210, and then to the external environment through the first sound guide channel 110. Alternatively, the sound signal in the external environment can penetrate the first sound guide channel 110 and then penetrate the sound guide opening 210, to be collected by the acoustical component 200. In an embodiment of this application, the acoustical component 200 may be a speaker or a microphone. A specific type of the acoustical component 200 is not limited in this embodiment of this application.

The communication support 300 is disposed in the inner cavity of the housing 100. The communication support 300 is provided with a second sound guide channel 300a. A first end of the communication support 300 is disposed in the first installation groove 220. The sound guide opening 210 is in communication with the first sound guide channel 110 through the second sound guide channel 300a. Specifically, the sound guide opening 210, the second sound guide channel 300a, and the first sound guide channel 110 are included in a complete sound propagation path. In a case that the acoustical component 200 is a sound-emitting component, the sound signal output by the acoustical component 200 penetrates the communication support 300 and the first sound guide channel 110 in turn and then propagates to the external environment. In a case that the acoustical component 200 is a sound collection component, the sound signal in the external environment penetrates the first sound guide channel 110 and the communication support 300 in turn and then propagates to an inside of the acoustical component 200. Finally, sound collection is implemented.

In an embodiment of this application, a part, between the housing 100 and the acoustical component 200, of the communication support 300, is a flexible connection section. The flexible connection section is deformable and may be bent relative to the housing 100 and the acoustical component 200. The flexible connection section may be well adaptively deformed based on an assembly position of the acoustical component 200, and may be more easily adapted to a sealing problem caused by an assembly error of the acoustical component 200. Further, a problem of a poor sealing effect caused by the assembly error is resolved. For the electronic device disclosed in this embodiment of this application, a sealing structure of the electronic device in the background is improved. The flexible connection section is disposed at a position, between the housing 100 and the acoustical component 200, on the communication support 300. In addition, the first installation groove 220 is disposed in the acoustical component 200. The first end of the communication support 300 is disposed in the first installation groove 220. The first installation groove 220 is matched with the communication support 300. Accordingly, the communication support 300 is more stable. The flexible connection section can be deformed and bent, and can be further adaptively deformed according to the assembly position of the acoustical component 200. Therefore, the problem of poor sealing caused by the assembly error of the acoustical component 200 may be prevented. It can be seen that the electronic device disclosed in the embodiments of this application can improve sealing performance of the electronic device.

In a further technical solution, a first dustproof net 400 may be disposed between an end surface of the first end of the communication support 300 and the bottom wall of the first installation groove 220. The first dustproof net 400 can improve a dustproof grade of a sound outlet of the acoustical component 200. The communication support 300 may include a first annular elastic sealing protrusion 311. The first annular elastic sealing protrusion 311 may be disposed around an outer peripheral surface of a first end of the communication support 300. The first annular elastic sealing protrusion 311 may be attached to a side wall of the first installation groove 220 in a sealing manner. Because the first annular elastic sealing protrusion 311 may be sealed with the side wall of the first installation groove 220, when the acoustical component 200 squeezes the communication support 300, a sealing effect of the electronic device is improved. A purpose of lateral compression sealing is achieved.

The first dustproof net 400 may be disposed between the end surface of the first end of the communication support 300 and the bottom wall of the first installation groove 220. Therefore, a sound propagation path can prevent invasion of a foreign matter such as dust, thereby achieve a dustproof effect. The first annular elastic sealing protrusion 311 may be disposed around the outer peripheral surface of the first end of the communication support 300. The side wall of the first installation groove 220 squeezes the first annular elastic sealing protrusion 311 at the first end of the communication support 300. Therefore, the lateral compression sealing is implemented.

In an embodiment of this application, the housing 100 may be provided with a second installation groove 120. The first sound guide channel 110 penetrates from a bottom wall of the second installation groove 120 to an outer surface of the housing 100. The second installation groove 120 may be matched with the communication support 300. Specifically, a second end of the communication support 300 may be disposed in the second installation groove 120. The first installation groove 220 and the second installation groove 120 are matched with each other. Therefore, the communication support 300 is effectively fixed. In a further technical solution, an end surface of the second end of the communication support 300 is opposite to the bottom wall of the second installation groove 120. A second dustproof net 500 may be disposed between the end surface of the second end of the communication support 300 and the bottom wall of the second installation groove 120. Matching between the second dustproof net 500 and the first dustproof net 400 can further improve dustproof performance. Design of double dustproof nets, the first dustproof net 400 and the second dustproof net 500, enables a dustproof effect to be better. Further, the dustproof grade of the electronic device is increased.

In a still further technical solution, the communication support 300 may include a second annular elastic sealing protrusion 321. The second annular elastic sealing protrusion 321 may be disposed around an outer peripheral surface of the second end of the communication support 300. The second annular elastic sealing protrusion 321 may be attached to a side wall of the second installation groove 120 in a sealing manner. The second annular elastic sealing protrusion 321 is attached to the side wall of the second installation groove 120. When the housing 100 squeezes the communication support 300, the sealing effect of the electronic device is improved, and a purpose of lateral sealing is achieved. The acoustical component 200 squeezes the first annular elastic sealing protrusion 311 of the communication support 300 to achieve inner sealing. The housing 100 squeezes the second annular elastic sealing protrusion 321 of the communication support 300 to achieve external sealing. Therefore, the sealing effect of the electronic device can be improved effectively. Further, a waterproof grade and dustproof grade of the electronic device is increased.

In an alternative solution, a width dimension of the first annular elastic sealing protrusion 311 may decrease from a bottom to a top of the first annular elastic sealing protrusion 311. In a case that the first installation groove 220 squeezes the communication support 300, a width dimension of the top of the first annular elastic sealing protrusion 311 is reduced. Therefore, the top of the first annular elastic sealing protrusion 311 is more easily extruded and deformed. Further, the first installation groove 220 squeezes the first annular elastic sealing protrusion 311. Accordingly, the sealing effect of the electronic device is better. In addition, a problem that the first end of the communication support 300 is not easily installed in the first installation groove 220 due to great strength of the top of the first annular sealing protrusion 311 is prevented.

In a further technical solution, the first annular elastic sealing protrusion 311 may include a first guide slope 311a facing the bottom wall of the first installation groove 220. The first guide slope 311a can play a good guide role. Therefore, the first end of the communication support 300 may be more easily inserted into the first installation groove 220.

Similarly, a width dimension of the second annular elastic sealing protrusion 321 may decrease from a bottom to a top of the second annular elastic sealing protrusion 321. In a case that second installation groove 120 squeezes the communication support 300, a width dimension of the top of the second annular elastic sealing protrusion 321 is reduced. Therefore, the top of the second annular elastic sealing protrusion 321 is more easily extruded and deformed. Further, the second installation groove 120 squeezes the second annular elastic sealing protrusion 321. Accordingly, the sealing effect of the electronic device is better. In addition, a problem that the second end of the communication support 300 is not easily installed in the second installation groove 120 due to great strength of the top of the second annular elastic sealing protrusion 321 is prevented.

In a further technical solution, the second annular elastic sealing protrusion 321 may include a second guide slope 312a facing the bottom wall of the second installation groove 120. The second guide slope 312a can play a good guide role. Therefore, the second end of the communication support 300 may be more easily inserted into the second installation groove 120.

In an embodiment of this application, a first sealant layer may be disposed between the end surface of the second end of the communication support 300 and the bottom wall of the second installation groove 120. The first sealant layer may be fixedly connected to the second dustproof net 500. Based on sealing fit between the second annular elastic sealing protrusion 321 and the side wall of the second installation groove 120, the first sealant layer can enable the sealing effect to be better. A second sealant layer may be disposed between the end surface of the first end of the communication support 300 and the bottom wall of the first installation groove 220. The second sealant layer may be fixedly connected to the first dustproof net 400. Based on sealing fit between the first annular elastic sealing protrusion 311 and the side wall of the first installation groove 220, the first sealant layer can enable the sealing performance of the electronic device to be better.

In the electronic device disclosed in an embodiment of this application, the communication support 300 may have various structures. In an alternative solution, the communication support 300 may include a first cylindrical sub-support 310, a second cylindrical sub-support 320, and a flexible connecting cylindrical member 330. The first cylindrical sub-support 310 and the second cylindrical sub-support 320 are connected by the flexible connecting cylindrical member 330. The first cylindrical sub-support 310 and the second cylindrical sub-support 320 may be rigid supports with higher hardness than that of the flexible connecting cylindrical member 330, and may also be elastic supports definitely, which is not limited in this embodiment of this application.

Specifically, a first end of the flexible connecting cylindrical member 330 is connected to the first cylindrical sub-support 310. A second end of the flexible connecting cylindrical member 330 is connected to the second cylindrical sub-support 320. The flexible connecting cylindrical member 330 includes the flexible connection section and the first annular elastic sealing protrusion 311. The flexible connection section is located between the first cylindrical sub-support 310 and the second cylindrical sub-support 320. The flexible connection section is deformable. Therefore, the flexible connecting cylindrical member 330 is more easily adapted to a sealing problem caused by an assembly error of the acoustical component 200. Therefore, a problem of a poor sealing effect caused by the assembly error can be effectively resolved. When the flexible connecting cylindrical member 330 is squeezed, the first annular elastic sealing protrusion 311 can effectively improve the sealing effect. The first dustproof net 400 is provided between the first cylindrical sub-support 310 and the bottom wall of the first installation groove 220.

In an alternative solution, the first end of the flexible connecting cylindrical member 330 may be sleeved on the first cylindrical sub-support 310. The second end of the flexible connecting cylindrical member 330 may be sleeved on the second cylindrical sub-support 320. In this case, the flexible connecting cylindrical member 330, the first cylindrical sub-support 310, and the second cylindrical sub-support 320 are connected into a whole. This split structure better facilitates local replacement of an accessory. Definitely, matching between the communication support 300 and the acoustical component 200, and matching between the housing 100 and the communication support 300 can ensure sealing assembly among the flexible connecting cylindrical member 330, the first cylindrical sub-support 310, and the second cylindrical sub-support 320.

In a further technical solution, the first cylindrical sub-support 310 may include a first limiting protrusion 312. The first limiting protrusion 312 may be matched with an end surface of the first end of the flexible connecting cylindrical member 330 in a limiting manner. In this case, matching in a limiting manner between the end surface of the first end of the flexible connecting cylindrical member 330 and the first limiting protrusion 312 prevents the first cylindrical sub-support 310 from being excessively assembled and slipping into the flexible connecting cylindrical member 330.

Similarly, the second cylindrical sub-support 320 may include a second limiting protrusion 322. The second limiting protrusion 322 may be matched with an end surface of the second end of the flexible connecting cylindrical member 330. In this case, matching in a limiting manner between the end surface of the second end of the flexible connecting cylindrical member 330 and the second limiting protrusion 322 prevents the second cylindrical sub-support 320 from being excessively assembled and slipping into the flexible connecting cylindrical member 330.

In an embodiment of this application, a part, between the first cylindrical sub-support 310 and the second cylindrical sub-support 320, of the flexible connecting cylindrical member 330, may be a corrugated pipe section. In this case, the flexible connecting cylindrical member 330 can be better adaptively deformed according to an assembly position of the acoustical component 200, thereby facilitating implementation of sealing assembly, and preventing an influence of an assembly error on the sealing assembly. The corrugated pipe section may be made of plastic or metal, which is not limited in this embodiment of this application. In the alternative solution, the corrugated pipe section includes the flexible connection section.

In an alternative solution, the communication support 300 may be an integrally injection-molded structural member. The communication support 300 includes a first cylindrical sub-support 310, a second cylindrical sub-support 320, and a flexible connecting cylindrical member 330. The first cylindrical sub-support 310 includes a first limiting protrusion 312. The second cylindrical sub-support 320 includes a second limiting protrusion 322. A first annular elastic sealing protrusion 311 may be disposed on the first cylindrical sub-support 310 or the flexible connecting cylindrical member 330. Similarly, a second annular elastic sealing protrusion 321 may be disposed on the second cylindrical sub-support 320 or the flexible connecting cylindrical member 330. A first end of the flexible connecting cylindrical member 330 is sleeved on the first cylindrical sub-support 310. A second end of the flexible connecting cylindrical member 330 is sleeved on the second cylindrical sub-support 320. The integrally injection-molded structural member is easily manufactured and assembled.

In a further technical solution, an edge of an end surface, away from the second cylindrical sub-support 320, of the first cylindrical sub-support 310 is provided with a chamfered guide surface. Design of the chamfered guide surface facilitates insertion of the first cylindrical sub-support 310 into the first installation groove 220, further facilitating assembly of an internal structure of the electronic device as a whole.

Similarly, an edge, facing away from the first cylindrical sub-support 310, of an end surface of the second cylindrical sub-support 320, may also be provided with a chamfered guide surface. Design of the chamfered guide surface facilitates insertion of the second cylindrical sub-support 320 into the second installation groove 120, further facilitating assembly of an internal structure of the electronic device as a whole.

The electronic device disclosed in the embodiments of this application may be a mobile phone, a tablet computer, an eBook reader, a game machine, a wearable device, and the like. The embodiments of this application do not limit a specific type of the electronic device.

The foregoing embodiments of this application focus on describing differences between the embodiments, and different optimization features of the embodiments may be combined to form better embodiments provided that they are not contradictory. Considering brevity, details are not described herein again.

The foregoing descriptions are only an embodiment of this application, and are not intended to limit this application. Various changes and modifications may be made to this application by those skilled in the art. Any modifications, equivalent substitutions, improvements, and the like made within the spirit and principle of this application should be included within the scope of the claims of this application.

The invention claimed is:

1. An electronic device, comprising a housing, an acoustical component, and a communication support, wherein
   the housing has an inner cavity, the acoustical component is disposed in the inner cavity, and the housing is provided with a first sound guide channel;
   the acoustical component is provided with a first installation groove, and a bottom wall of the first installation groove is provided with a sound guide opening;
   the communication support is provided with a second sound guide channel, a first end of the communication support is disposed in the first installation groove, and the sound guide opening is in communication with the first sound guide channel through the second sound guide channel; and
   a part, between the housing and the acoustical component, of the communication support, is a flexible connection section.

2. The electronic device according to claim 1, wherein a first dustproof net is disposed between an end surface of the first end of the communication support and the bottom wall of the first installation groove, the communication support comprises a first annular elastic sealing protrusion, the first annular elastic sealing protrusion is disposed around an outer peripheral surface of the first end of the communication support, and the first annular elastic sealing protrusion is attached to a side wall of the first installation groove in a sealing manner.

3. The electronic device according to claim 2, wherein the housing is provided with a second installation groove, and the first sound guide channel penetrates from a bottom wall of the second installation groove to an outer surface of the housing; a second end of the communication support is disposed in the second installation groove, and a second dustproof net is disposed between an end surface of the second end of the communication support and the bottom wall of the second installation groove; and
   the communication support comprises a second annular elastic sealing protrusion, the second annular elastic sealing protrusion is disposed around an outer peripheral surface of the second end of the communication support, and the second annular elastic sealing protrusion is attached to a side wall of the second installation groove in a sealing manner.

4. The electronic device according to claim 3, wherein a width dimension of the first annular elastic sealing protrusion decreases from a bottom to a top of the first annular elastic sealing protrusion, and the first annular elastic sealing protrusion comprises a first guide slope facing the bottom wall of the first installation groove; and/or a width dimension of the second annular elastic sealing protrusion decreases from a bottom to a top of the second annular elastic sealing protrusion, and the second annular elastic sealing protrusion comprises a second guide slope facing the bottom wall of the second installation groove.

5. The electronic device according to claim 3, wherein a first sealant layer is disposed between the end surface of the second end of the communication support and the bottom wall of the second installation groove, and the first sealant layer is fixedly connected to the second dustproof net, a second sealant layer is disposed between the end surface of the first end of the communication support and the bottom wall of the first installation groove, and the second sealant layer is fixedly connected to the first dustproof net.

6. The electronic device according to claim 1, wherein the communication support comprises a first cylindrical sub-support, a second cylindrical sub-support, and a flexible connecting cylindrical member, a first end of the flexible connecting cylindrical member is connected to the first cylindrical sub-support, a second end of the flexible connecting cylindrical member is connected to the second cylindrical sub-support, the flexible connecting cylindrical member comprises the flexible connection section, and the flexible connection section is located between the first cylindrical sub-support and the second cylindrical sub-support.

7. The electronic device according to claim 6, wherein the first end of the flexible connecting cylindrical member is sleeved on the first cylindrical sub-support, and the second end of the flexible connecting cylindrical member is sleeved on the second cylindrical sub-support.

8. The electronic device according to claim 7, wherein the first cylindrical sub-support comprises a first limiting protrusion, and the first limiting protrusion is matched with an end surface of the first end of the flexible connecting cylindrical member, the second cylindrical sub-support comprises a second limiting protrusion, and the second limiting protrusion is matched with an end surface of the second end of the flexible connecting cylindrical member.

9. The electronic device according to claim 6, wherein a part, between the first cylindrical sub-support and the second cylindrical sub-support, of the flexible connecting cylindrical member, is a corrugated pipe section.

10. The electronic device according to claim 6, wherein the communication support is an integrally injection-molded structural member.

* * * * *